(12) United States Patent
Antipa

(10) Patent No.: US 9,723,078 B2
(45) Date of Patent: Aug. 1, 2017

(54) TEMPORARY CONTENT VERSIONING ON A CLIENT IN A REST-BASED SYSTEM

(71) Applicant: Adobe Systems Incorporated, San Jose, CA (US)

(72) Inventor: Damien Antipa, Saint-Louis (FR)

(73) Assignee: Adobe Systems Incorporated, San Jose, CA (US)

( * ) Notice: Subject to any disclaimer, the term of this patent is extended or adjusted under 35 U.S.C. 154(b) by 174 days.

(21) Appl. No.: 14/051,732

(22) Filed: Oct. 11, 2013

(65) Prior Publication Data

US 2015/0106426 A1    Apr. 16, 2015

(51) Int. Cl.
*G06F 15/16* (2006.01)
*H04L 29/08* (2006.01)

(52) U.S. Cl.
CPC ................... *H04L 67/1097* (2013.01)

(58) Field of Classification Search
CPC .......... H04L 67/42; H04L 63/10; H04L 67/02
See application file for complete search history.

(56) References Cited

U.S. PATENT DOCUMENTS

| | | | | |
|---|---|---|---|---|
| 8,682,722 B1 * | 3/2014 | Des Jardins | ....... | G06Q 30/0251 455/3.01 |
| 9,002,790 B2 * | 4/2015 | Aikas | ................ | G06F 17/30289 707/634 |
| 2004/0001102 A1 * | 1/2004 | Blaschke | ................. | G09G 5/14 715/789 |
| 2005/0187989 A1 * | 8/2005 | Kaneko | ......................... | 707/203 |
| 2009/0164515 A1 * | 6/2009 | Wang | ......................... | 707/104.1 |
| 2010/0191783 A1 * | 7/2010 | Mason | .............. | G06F 17/30088 707/822 |
| 2011/0055329 A1 * | 3/2011 | Abt, Jr. | ............... | G06F 17/3089 709/205 |
| 2012/0054594 A1 * | 3/2012 | Isaacson et al. | .............. | 715/230 |
| 2014/0026182 A1 * | 1/2014 | Pearl et al. | ........................ | 726/1 |
| 2014/0181008 A1 * | 6/2014 | Belanger | ........... | G06F 17/30383 707/609 |

* cited by examiner

*Primary Examiner* — Tauqir Hussain
(74) *Attorney, Agent, or Firm* — Finch & Maloney PLLC

(57) ABSTRACT

Techniques are disclosed for maintaining different versions of a web resource. A client-side application observes and tracks all asynchronous requests for web resources sent from the client to a server. Every time a user attempts to modify a resource on the server, the application stops or otherwise pauses the execution of the request and retrieves a representation of the resource from the server in an original state. The representation is stored locally on the client in a local storage, such as browser persistent storage, and may be stored with a timestamp and the corresponding resource URL. Subsequently, the request to modify the resource is executed. In this manner, a representation of the resource is retained in an original state prior to modification. The locally-stored representation can be used to restore the resource back to the original state in response to a so-called undo request by the user.

18 Claims, 3 Drawing Sheets

TEMPORARY CONTENT VERSIONING ON A CLIENT IN A REST-BASED SYSTEM

FIELD OF THE DISCLOSURE

This disclosure relates generally to the field of data processing, and more particularly, to techniques for maintaining different versions of a web resource, such as objects in an object database.

BACKGROUND

Representational state transfer ("REST") is a software architecture for distributed systems, such as the World Wide Web. In a REST architecture, servers hold resources such as web page content, documents, images and other types of information that are addressable by a client. A client wishing to create or modify a resource sends data representing the resource to the server, which stores the data in a repository such as a database. A client wishing to access an existing resource can initiate a request to the server, which then provides a representation of the requested resource to the client. A representation of a resource may include, for example, a document that captures the current or intended state of the requested resource. Generally speaking, in a REST-based system, servers have responsibility for maintaining resources without concern for the user interface or user context (e.g., session state), while clients have responsibility for providing the user interface and acquiring, interpreting and reacting to the user context without concern for maintaining the resources. Further, the server generally operates in a stateless environment in which the server does not store the user context between requests. Accordingly, each request generated by the client contains all of the context information needed for the server to provide the requested resource.

DETAILED DESCRIPTION

Figure 1:
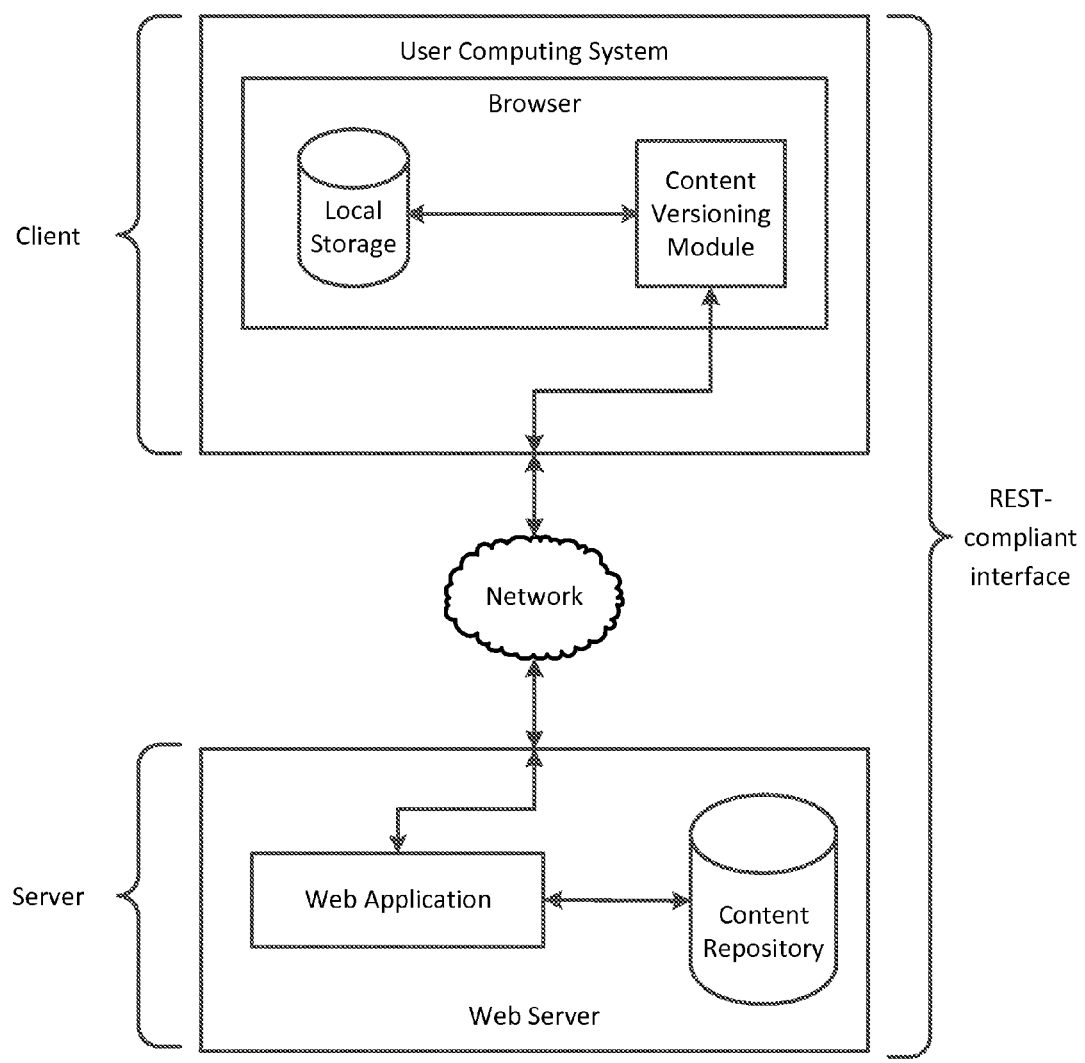
FIG. 1 illustrates an example user computing system configured in accordance with an embodiment of the present invention.

Techniques are disclosed for maintaining different versions of a web resource. In one embodiment, a client-side application (e.g., a JavaScript application programming interface or API) observes and tracks all asynchronous requests for web resources sent from the client to a server. Every time a user attempts to modify a resource on the server, the application stops or otherwise pauses the execution of the request and retrieves a representation of the resource from the server in an original state (i.e., prior to modification). For example, the application may retrieve the representation by executing a GET request. The representation may then be received in, for example, a JavaScript Object Notation (JSON) format. The representation is stored locally on the client in a local storage, such as browser persistent storage, and may be stored with a timestamp and the corresponding resource URL. Subsequently, the request to modify the resource is executed. In this manner, a representation of the resource is retained by the client in an original state prior to modification. The locally-stored representation can be used to restore the resource back to the original state in response to a so-called undo request from the user. To restore the resource to the original state, the application may, for example, execute a PUT request based on the locally-stored representation. In some embodiments, the modification to the web resource can be restored in response to a so-called redo request from the user. Numerous configurations and variations will be apparent in light of this disclosure.

General Overview

In some content-centric applications, such as word processors, graphics editors and the like, techniques are provided for restoring the content to a prior, unmodified state after the user has made changes to it. This process is sometimes referred to as an "undo" operation. Generally, an undo operation discards the last change made to the content and restores the content to a state that existed before the change was made. Conversely, a "redo" operation reverses the undo operation or repeats a previous command. These techniques can be implemented in environments where the content-centric application maintains a history of the state or context of the user. Another type of content-centric application is a web application, such as a web content management system (WCMS). Such web applications can be REST-compliant, particularly in client-server environments on the World Wide Web. However, REST-compliant web applications reside on servers that operate in a stateless environment in which the web application generally does not store the context of the user. Because of this, each request generally should contain all of the context information needed for the web application to provide the requested resource. For example, if a client has retrieved a web page on a website and subsequently wishes to navigate to a different page on the same website, the request from the client to the server may include all of the information needed to identify the desired page, such as a uniform resource locator (URL) or other such address convention, irrespective of any prior activity on the website. Further, the client should maintain any context information needed to properly access the desired resource. For instance, if a user is filling out a web-based form that spans multiple web pages, the client may retain information about the user's form-filling progress (e.g., which parts of the form have been filled out so far), since a REST-compliant server may not maintain such information and, if so, is not able to revert to a prior state.

Thus, and in accordance with an embodiment of the present invention, techniques are provided herein for maintaining different versions of a web resource stored in a client-based repository on a stateless REST-compliant system. In one specific embodiment, a request to change a web resource in a stateless REST-compliant software architecture is received via a web browser. As used herein, the term "web resource," in addition to its plain and ordinary meaning, includes, but is not limited to, anything or any entity that can be identified, named, addressed or handled in any networked information system, such as the World Wide Web. Some specific examples of web resources include electronic documents, files, web pages, images, objects, services, collections of resources and/or generally anything that has an identity and can be referenced in some manner. Some web resources can be referenced using a type of Uniform Resource Identifier (URI), such as a Uniform Resource Locator (URL), although it will be understood that various embodiments are not limited to using such addressing schemes. In one specific example, a user may be using a web application via a web browser to manipulate values stored in a Content Repository for Java (JCR), which resides on a web server. In this example, one or more of the values in the JCR may constitute all or part of a particular web resource that the user is attempting to change. The request to change the web resource is intercepted by, for example, an application programming interface (API) or other client-side module before the request is executed by the web application. The API may be implemented, for example, using JavaScript or other suitable code. In response to receiving the request, a representation (copy) of the web resource in an original (unchanged) state is retrieved by executing, for example, a GET request before the requested change to the web resource is performed. The representation can be received in a JSON format, although any suitable format can be used. JSON is a syntax for storing and exchanging text information; other formats can be used. Once retrieved, the representation is stored in a storage local to the web browser (e.g., a browser persistent storage such as sessionStorage or localStorage). Subsequently, the web resource is changed to a modified (changed) state according to the request. In this manner, the original state of the web resource is stored locally to the web browser and is not exposed to the server. The user may then perform an undo operation to restore the web resource from the modified state to the original state. In response to receiving a request to perform the undo operation, the web resource is restored to the original state based on the stored representation by executing, for example, a PUT or POST request. In one specific embodiment, the GET, PUT and/or POST request can include an XMLHTTPRequest or other mechanism for sending a suitable request to a web server. In some embodiments, any number of prior states of the web resource may be stored locally, permitting the undo operation to be performed a corresponding number of times, as will be apparent. In some other embodiments, a redo operation can be implemented by storing the web resource in the modified state prior to restoring the web resource to the original state, and subsequently, in response to a request to perform the redo operation, restoring the web resource to the modified state based on the stored representation.

System Architecture

FIG. 1 illustrates an example system for maintaining different versions of a web resource configured in accordance with an embodiment. The system includes a user computing system and a web server communicatively coupled to the user computing system via a network. The user computing system includes a web browser that can be used to access and interact with a web application executable by the server via a REST-compliant interface. As used herein, the term "web browser," in addition to its plain and ordinary meaning, includes any software application for retrieving, presenting and traversing information resources on the World Wide Web or other collection of data, documents and information. The web server hosts a content repository for storing various web resources. The browser includes a local storage and a content versioning module. The content versioning module is configured to operate in conjunction with other aspects of the browser for accessing the web application via the network, and for accessing and changing web resources in the content repository. The web application may include, for example, a web content management system (WCMS), such as Adobe CQ5. The content repository may house, for example, a JCR object database. The system may include additional components and still fall within the scope of the disclosed embodiments. The browser can be any of a number of browsers, including, for example, Microsoft Internet Explorer®, Mozilla Firefox®, Safari®, Google Chrome®, and Opera®. The user computing system can be configured to execute any of a number of operating systems, such as Microsoft Windows®, Mac OS®, Google Android® and any one of the Linux®-based operating systems. The user computing system can be implemented with any suitable computing device, such as a laptop, desktop, tablet computer, smartphone, or other suitable computing device capable of receiving input from a user and providing a GUI via the display. The local storage and/or content repository can be implemented, for example, with any suitable type of memory, such as a disk drive included in, or otherwise in communication with, the browser, the content versioning module and/or the web application. Other suitable memories include flash memory, random access memory (RAM), a memory stick or thumb drive, USB drive, cloud storage service, etc. In a more general sense, any memory facility can be used to implement the data storage. The network can be any communications network, such as a local area network or the Internet, or any other public and/or private communication network. Such a system may be suitable, for example, for versioning of a web resource using techniques as variously described herein.

It will be appreciated that, in some embodiments, various functions performed by the browser, the content versioning module, the web application, and the local storage and the content repository, as described herein, can performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the content versioning module and web application, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Data Flow

Figure 2:
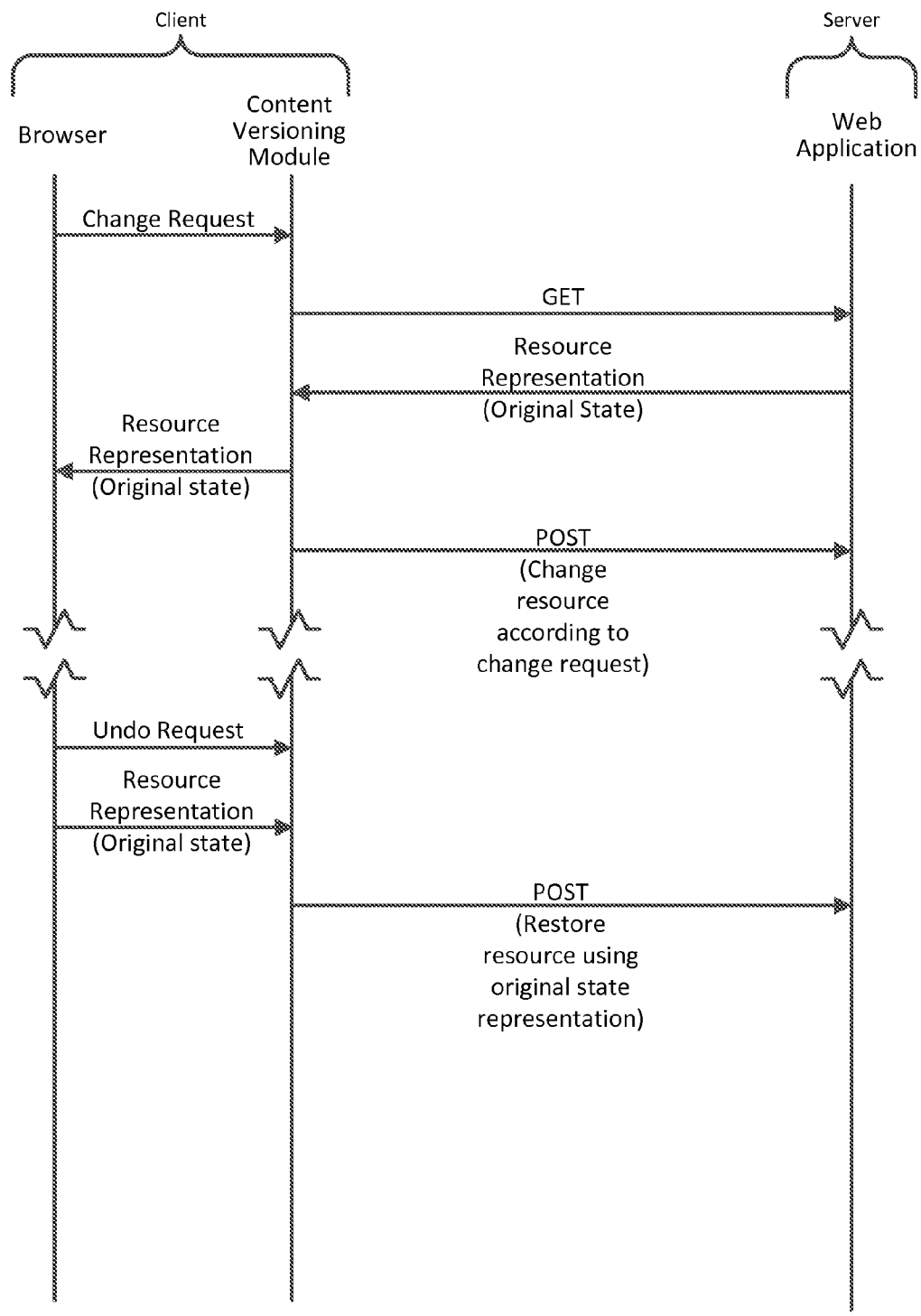
FIG. 2 illustrates an example data flow diagram in accordance with an embodiment of the present invention.

FIG. 2 illustrates an example data flow of a REST-compliant client-server system, such as the one shown in FIG. 1, in accordance with an embodiment. It will be understood that the order or sequence of the data flow shown is merely one example, and that embodiments may be practiced using various orderings or sequencings, or using various components not specifically shown or described, as will be apparent in light of this disclosure. The client is configured to execute a browser and a content versioning module, and the server is configured to execute a web application, such as described with respect to FIG. 1. Initially, a user submits, via the browser, a change request to change a web resource housed on the server. The content versioning module receives and intercepts the change request, temporarily preventing the request from reaching the web application. In response to receiving the change request, the content versioning module sends a retrieve request (e.g., a GET request) to the web application to retrieve a representation (copy) of the web resource the user wishes to change. The web application responds by returning the representation of the web resource in an original (unchanged) state to the content versioning module. In turn, the content versioning module sends the representation to the browser for storage (e.g., in a browser persistent storage), and forwards the change request (e.g., as a POST or PUT request) to the web application, where the change is applied, placing the web resource into a modified state. At this point, the web resource has been changed according to the user request, and a copy of the web resource prior to being changed is stored in the browser.

Subsequently, the user submits, via the browser, an undo request for the same web resource that was previously changed. The content versioning module receives the undo request, retrieves the representation of the corresponding web resource in the original state, which is stored in the web browser, and sends that representation to the web application (e.g., as another POST or PUT request), where the web resource is restored to the original state. In this manner, one or more prior states of any given web resource can be stored in the browser and used to restore changes made to the web resource on the server to the prior state(s). As will be apparent, in some embodiments, any number of different web resources can be restored to any number of prior states using the techniques variously described herein.

Example Methodology for Navigation in a Hierarchical Node Structure

Figure 3:
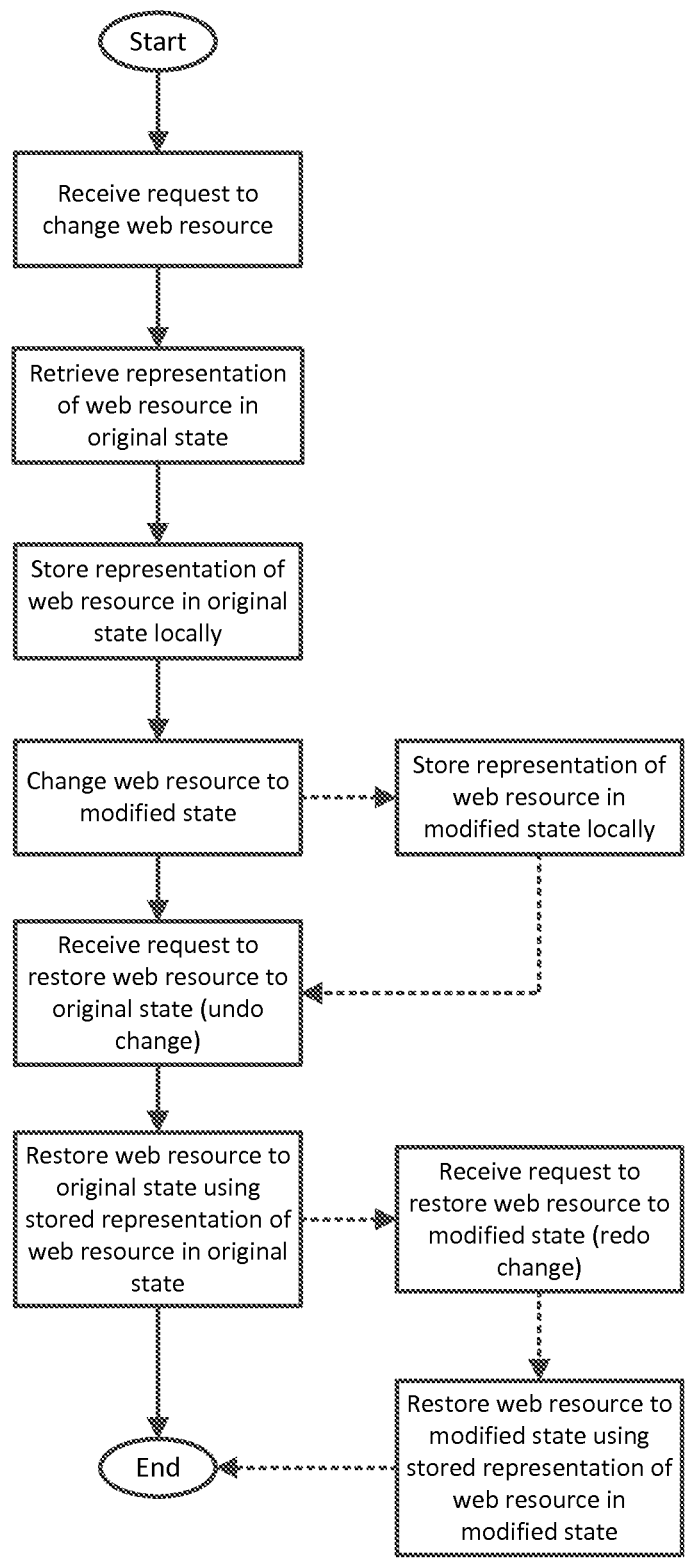
FIG. 3 illustrates an example methodology for maintaining different versions of a web resource in accordance with an embodiment of the present invention.

FIG. 3 illustrates a methodology for maintaining different versions of a web resource, according to an embodiment. This method can be carried out, for example, by the content versioning module in the user computing system of FIG. 1. JavaScript or other suitable code can be used to implement the method. In one such embodiment, the methodology can be used in conjunction with web resources stored in a content repository, such as depicted in the example of FIG. 1. Such web resources may, for example, includes objects in a Content Repository for Java (JCR).

The method begins by receiving, via a REST-compliant interface, a request to change a web resource. For example, a user may wish to change a value stored in the JCR. In response to receiving the request, a representation of the web resource in an original (unchanged) state is retrieved by executing, for example, a GET request. The retrieved representation of the web resource in the original state is stored locally, for example, in a persistent storage of the browser. In some embodiments, the representation can be stored with a timestamp and/or corresponding resource URL. The stored representation can be used subsequently to restore the web resource to the original state after it has been changed. Any number of representations of the web resource can be stored so that any of a number of different versions of the web resource can be restored at a later time.

The method continues by changing the web resource to a modified state according to the request by executing, for example, a POST or PUT request. In some embodiments, a representation of the web resource in the modified state can be stored locally, for example, in the persistent storage of the browser. Any number of representations of the web resource in one or more modified states can be stored so that any of a number of different versions of the web resource can be restored at a later time. Subsequent to changing the web resource to the modified state, the method continues by receiving a request to restore the web resource to the original state or to a prior modified state (perform an undo operation). In response to receiving the request, the web resource is restored to the original state or a prior modified state based on the stored representation of the web resource in the original state (or other version) by executing, for example, a POST or PUT request. In some embodiments, subsequent to restoring the web resource to the original state, the method continues by receiving a request to restore the web resource to the modified state (perform a redo operation). In response to receiving the request, the web resource is restored to the modified state based on the stored representation of the web resource in the modified state by executing, for example, a POST or PUT request.

Numerous embodiments will be apparent in light of the present disclosure, and features described herein can be combined in any number of configurations. One example embodiment provides a computer-implemented method. The method includes receiving, via a web browser, a first request to change a web resource in a stateless representational state transfer (REST)-compliant software architecture. In response to receiving the first request, the method includes retrieving a representation of the web resource in an original state, storing the representation of the web resource in the original state in a storage local to the web browser, and changing the web resource to a modified state according to the first request. The method further includes receiving a second request to restore the web resource to the original state, and, in response to receiving the second request, restoring the web resource to the original state based on the stored representation of the web resource in the original state. In some cases, the method includes storing a representation of the web resource in the modified state in the storage. In some such cases, the method further includes receiving a third request to restore the web resource to the modified state. In some such cases, the method further includes, in response to receiving the third request, restoring the web resource to the modified state based on the stored representation of the web resource in the modified state. In some cases, retrieving the representation of the web resource in the original state includes receiving the representation in a JavaScript Object Notation (JSON) format. In some cases, the local storage includes a browser-persistent storage. In some cases, retrieving the representation of the web resource in the original state includes executing a GET request. In some cases, changing the web resource to the modified state includes executing a POST or PUT request. In some cases, the web resource is housed in a Content Repository Application Programming Interface for Java (JCR). In some cases, some or all of the functions variously described in this paragraph can be performed in any order and at any time by one or more different user computing systems.

Another example embodiment provides a system having a storage local to a web browser, and a processor operatively coupled to the storage and configured to carry out a process. The process includes receiving, via the web browser, a first request to change a web resource in a stateless representational state transfer (REST)-compliant software architecture. In response to receiving the first request, the method further includes retrieving a representation of the web resource in an original state, storing the representation of the web resource in the original state in the storage, and changing the web resource to a modified state according to the first request. The method further includes receiving a second request to restore the web resource to the original state, and, in response to receiving the second request, restoring the web resource to the original state based on the stored representation of the web resource in the original state. In some cases, the process includes storing a representation of the web resource in the modified state in the storage. In some such cases, the process further includes receiving a third request to restore the web resource to the modified state. In some such cases, the process further includes, in response to receiving the third request, restoring the web resource to the modified state based on the stored representation of the web resource in the modified state. In some cases, retrieving the representation of the web resource in the original state includes receiving the representation in a JavaScript Object Notation (JSON) format. In some cases, retrieving the representation of the web resource in the original state includes executing a GET request. In some cases, changing the web resource to the modified state includes executing a POST or PUT request. In some cases, the web resource is housed in a Content Repository Application Programming Interface for Java (JCR). Another example embodiment provides a non-transient computer-readable medium or computer program product having instructions encoded thereon that when executed by one or more processors cause the processor(s) to perform one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a computer processor and via a web browser, a first request to change a web resource in a stateless representational state transfer (REST)-compliant software architecture;
   in response to receiving the first request, retrieving, by the computer processor, a representation of the web resource in an original state from a server;
   storing, by the computer processor, the representation of the web resource in the original state in a storage local to the web browser;
   changing, by the computer processor, the web resource on the server to a modified state according to the first request subsequent to retrieving and storing the representation of the web resource in the original state;
   receiving, by the computer processor, a second request to restore the web resource on the server from the modified state to the original state;
   in response to receiving the second request, restoring, by the computer processor, the web resource to the original state by sending the locally stored representation of the web resource in the original state to the server after the web resource in the stateless REST-compliant software architecture and residing on the server has been changed to the modified state; and
   wherein the web resource is housed in a Content Repository Application Programming Interface for Java (JCR) in the stateless REST-compliant software architecture, and wherein the stateless REST-compliant software architecture does not preserve a context of the user, including the original state of the web resource, when the web resource is changed to the modified state.

2. The method of claim 1, further comprising storing, by the computer processor, a representation of the web resource in the modified state in the storage.

3. The method of claim 2, further comprising receiving, by the computer processor, a third request to restore the web resource to the modified state.

4. The method of claim 3, further comprising, in response to receiving the third request, restoring, by the computer processor, the web resource to the modified state based on the stored representation of the web resource in the modified state.

5. The method of claim 1, wherein retrieving the representation of the web resource in the original state includes receiving the representation in a JavaScript Object Notation (JSON) format.

6. The method of claim 1, wherein the local storage includes a browser-persistent storage.

7. The method of claim 1, wherein retrieving the representation of the web resource in the original state includes executing a GET request.

8. The method of claim 1, wherein changing the web resource to the modified state includes executing a POST or PUT request.

9. A system comprising:
   a storage local to a web browser; and
   a computer processor operatively coupled to the storage and configured to carry out a process comprising:
   receiving, via the web browser, a first request to change a web resource in a stateless representational state transfer (REST)-compliant software architecture;
   in response to receiving the first request, retrieving a representation of the web resource in an original state from a server;
   storing the representation of the web resource in the original state in the storage;
   changing the web resource on the server to a modified state according to the first request subsequent to retrieving and storing the representation of the web resource in the original state;
   receiving a second request to restore the web resource on the server from the modified state to the original state;
   in response to receiving the second request, restoring the web resource to the original state by sending the locally stored representation of the web resource in the original state to the server after the web resource in the stateless REST-compliant software architecture and residing on the server has been changed to the modified state; and
   wherein the web resource is housed in a Content Repository Application Programming Interface for Java (JCR) in the stateless REST-compliant software architecture, and wherein the stateless REST-compliant software architecture does not preserve a context of the user, including the original state of the web resource, when the web resource is changed to the modified state.

10. The system of claim 9, wherein the process further comprises storing a representation of the web resource in the modified state in the storage.

11. The system of claim 10, wherein the process further comprises receiving a third request to restore the web resource to the modified state.

12. The system of claim 11, wherein the process further comprises, in response to receiving the third request, restoring the web resource to the modified state based on the stored representation of the web resource in the modified state.

13. The system of claim 9, wherein retrieving the representation of the web resource in the original state includes receiving the representation in a JavaScript Object Notation (JSON) format.

14. The system of claim 9, wherein retrieving the representation of the web resource in the original state includes executing a GET request.

15. The system of claim 9, wherein changing the web resource to the modified state includes executing a POST or PUT request.

16. A non-transitory computer-readable medium having instructions encoded thereon that when executed by a computer processor cause the processor to carry out a process comprising:
   receiving, via a web browser, a first request to change a web resource in a stateless representational state transfer (REST)-compliant software architecture;
   in response to receiving the first request, retrieving a representation of the web resource in an original state from a server;
   storing the representation of the web resource in the original state in a storage local to the web browser;
   changing the web resource on the server to a modified state according to the first request subsequent to retrieving and storing the representation of the web resource in the original state;
   receiving a second request to restore the web resource on the server from the modified state to the original state;
   in response to receiving the second request, restoring the web resource to the original state by sending the locally stored representation of the web resource in the original state to the server after the web resource in the stateless REST-compliant software architecture and residing on the server has been changed to the modified state; and
   wherein the web resource is housed in a Content Repository Application Programming Interface for Java (JCR) in the stateless REST-compliant software architecture, and wherein the stateless REST-compliant software architecture does not preserve a context of the user, including the original state of the web resource, when the web resource is changed to the modified state.

17. The computer-readable medium of claim 16, wherein retrieving the representation of the web resource in the original state includes executing a GET request, and wherein changing the web resource to the modified state includes executing a POST or PUT request.

18. The method of claim 1, further comprising storing, by the computer processor, a timestamp and a Uniform Resource Locator (URL) corresponding to the original state of the representation of the web resource in the storage local to the web browser.

\* \* \* \* \*